(12) United States Patent
Gortler et al.

(10) Patent No.: US 10,529,145 B2
(45) Date of Patent: Jan. 7, 2020

(54) TOUCH GESTURES FOR NAVIGATION AND INTERACTING WITH CONTENT IN A THREE-DIMENSIONAL SPACE

(71) Applicant: Mental Canvas LLC, Madison, CT (US)

(72) Inventors: Steven Gortler, Waltham, MA (US); Julie Dorsey, Madison, CT (US); Leonard McMillan, Chapel Hill, NC (US); Duligur Ibeling, Maple Grove, MN (US)

(73) Assignee: Mental Canvas LLC, Madison, CT (US)

( * ) Notice: Subject to any disclaimer, the term of this patent is extended or adjusted under 35 U.S.C. 154(b) by 12 days.

(21) Appl. No.: 15/471,644

(22) Filed: Mar. 28, 2017

(65) Prior Publication Data

US 2017/0287230 A1  Oct. 5, 2017

Related U.S. Application Data

(60) Provisional application No. 62/314,496, filed on Mar. 29, 2016.

(51) Int. Cl.
*G06T 19/20* (2011.01)

(52) U.S. Cl.
CPC ...... *G06T 19/20* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 6,346,938 B1* | 2/2002 | Chan | ................... | G06F 3/04815 345/419 |
| 7,167,189 B2* | 1/2007 | Di Lelle | ............... | G06T 15/503 345/677 |
| 7,696,998 B2* | 4/2010 | Bae | ........................ | G06T 11/203 345/419 |
| 7,814,436 B2* | 10/2010 | Schrag | ................ | G06F 3/04815 715/836 |
| 7,903,109 B2* | 3/2011 | Rurin | ....................... | G06T 15/20 345/158 |
| 8,089,479 B2* | 1/2012 | Deb | ....................... | G06T 19/003 345/419 |
| 8,717,360 B2* | 5/2014 | Vesely | .................... | G06T 15/00 345/427 |
| 8,941,603 B2* | 1/2015 | Karlsson | ................. | G06F 3/011 340/407.1 |
| 9,098,647 B2* | 8/2015 | Boyd | ................... | G06F 3/04815 |
| 9,105,094 B2* | 8/2015 | Tijssen | .................... | G06T 11/00 |
| 9,111,371 B2* | 8/2015 | Dayanand | ............... | G06T 19/00 |

(Continued)

*Primary Examiner* — Motilewa Good Johnson
(74) *Attorney, Agent, or Firm* — Goodwin Procter LLP

(57) ABSTRACT

A computer-implemented method of manipulating some portion of a 3D representation of a scene from a reference view direction using a touch-sensitive display unit that includes identifying, by the touch-sensitive display unit, the portion of the 3D representation of the scene to be translated; generating and displaying on some portion of a display device of the touch-sensitive display unit a second 3D representation of the scene from an auxiliary view direction that may be selectively adjustable; and using the second 3D representation of the scene to translate the portion of the 3D representation of the scene.

14 Claims, 5 Drawing Sheets

(56) References Cited

U.S. PATENT DOCUMENTS

| | | | |
|---|---|---|---|
| 10,032,306 B2* | 7/2018 | Oh | G06T 13/80 |
| 2004/0225968 A1* | 11/2004 | Look | G06F 3/0481 |
| | | | 715/778 |
| 2008/0180406 A1* | 7/2008 | Han | G06F 3/04883 |
| | | | 345/173 |
| 2012/0005624 A1* | 1/2012 | Vesely | G06F 3/012 |
| | | | 715/808 |
| 2012/0007862 A1* | 1/2012 | Shefi | G06T 11/206 |
| | | | 345/419 |
| 2012/0066648 A1* | 3/2012 | Rolleston | G06F 3/04815 |
| | | | 715/849 |
| 2012/0176516 A1* | 7/2012 | Elmekies | G06F 3/011 |
| | | | 348/239 |
| 2013/0222363 A1* | 8/2013 | Chu | G06F 3/04815 |
| | | | 345/419 |
| 2013/0222385 A1* | 8/2013 | Dorsey | G06T 11/20 |
| | | | 345/427 |
| 2013/0223691 A1* | 8/2013 | Paczkowski | A61B 17/80 |
| | | | 382/106 |
| 2013/0265220 A1* | 10/2013 | Fleischmann | G06F 3/011 |
| | | | 345/156 |
| 2014/0019917 A1* | 1/2014 | Piemonte | G06F 3/017 |
| | | | 715/848 |
| 2015/0062118 A1* | 3/2015 | Ebner | B60K 37/06 |
| | | | 345/419 |
| 2015/0091903 A1* | 4/2015 | Costello | G06T 15/20 |
| | | | 345/426 |
| 2015/0248788 A1* | 9/2015 | Abovitz | G06K 9/00671 |
| | | | 345/633 |
| 2015/0332515 A1* | 11/2015 | Elmekies | H04W 4/026 |
| | | | 345/419 |
| 2016/0195849 A1* | 7/2016 | Takagi | G03H 1/2249 |
| | | | 348/40 |
| 2017/0278310 A1* | 9/2017 | Dorsey | G06F 3/04815 |

* cited by examiner

TOUCH GESTURES FOR NAVIGATION AND INTERACTING WITH CONTENT IN A THREE-DIMENSIONAL SPACE

CROSS-REFERENCE TO RELATED APPLICATIONS

This application claims priority to and the benefit of U.S. Provisional Patent Application No. 62/314,496, filed Mar. 29, 2016, the disclosure of which is incorporated herein by reference in its entireties.

FIELD OF THE INVENTION

The present invention relates to computer-implemented methods and systems for three-dimensional (3D) object manipulation, especially on a touch-sensitive display unit, such as an iPad and the like.

BACKGROUND OF THE INVENTION

During 3D interactive editing or modifying of a representation of a scene, an editor (hereinafter, a user) often may desire to move a target object while viewing the movement within the representation of the scene in real-time using a reference virtual camera. For example, in some applications, a user may desire to translate a two-dimensional (2D) object, e.g., artwork, a drawing, and so forth, in a direction normal to the orientation of the 2D plane on which the 2D object is stored. Alternatively, the user may desire to rotate a 2D or 3D object about an axis of rotation that lies within the 2D plane or within the 3D space.

In some instances, the actual amount of translation or rotation may be determined interactively. For example, in some applications, the user may move a slider, observing in real-time or near real-time the resulting change in geometry on the screen of the display device, until the slider reaches a desired location and/or orientation. Disadvantageously, however, there may be situations in which, during translation and/or rotation, an original view direction of a reference virtual camera provides a poor vantage point from which to view the manipulated geometry on the display device. Such problems arise frequently during a "projection" mode, in which the user is rotating or translating a planar object or a planar canvas containing the object, while image data are being "slide projected" onto the reference planar canvas in instances in which the view direction of the reference virtual camera serves as the slide projector's center.

However, because the view direction of the reference virtual camera is typically oriented in a direction normal to the surface of the frontal planar canvas, it may be difficult to gauge with any precision how far the user has moved the object (or a second frontal canvas containing the object) with respect to the reference frontal planar canvas. As a result, providing an additional camera view direction(s) from an auxiliary virtual camera may be useful to users. In short, it may be desirable to selectively provide a camera view direction(s) from an auxiliary virtual camera that is not necessarily normal to the frontal planar canvas, e.g., a side perspective, a top perspective, a front perspective, a rear perspective, and the like. Advantageously, when viewed obliquely from a different virtual camera angle, e.g., a ¾-top or ¾-side view, changes in the projected data on the planar canvas are discernable.

SUMMARY OF THE INVENTION

In a first aspect, some embodiments of the present invention relate to a computer-implemented method of manipulating some portion of a 3D representation of a scene from a reference view direction using a touch-sensitive display unit. In some implementations, the method includes identifying, by the touch-sensitive display unit, the portion of the 3D representation of the scene to be translated; generating and displaying on some portion of a display device of the touch-sensitive display unit a second 3D representation of the scene from an auxiliary view direction that may be selectively adjustable; and using the second 3D representation of the scene to translate the portion of the 3D representation of the scene. In a first variation, translating the portion of the 3D representation of the scene includes moving the portion closer to and/or farther from a reference virtual camera.

In some implementations, generating and displaying the second 3D representation of the scene includes generating and displaying the second 3D representation of the scene in a pop-up window. For example, in some variations, the second 3D representation of the scene in the pop-up window is displayed on the display device contemporaneously with the 3D representation of the scene. In another implementation, generating and displaying the second 3D representation of the scene includes positioning an auxiliary virtual camera having a location in 3D space remote from that of a reference virtual camera. For example, in some variations, the second 3D representation of the scene from the auxiliary virtual camera, e.g., from a side of, above, and/or below a reference view direction, is displayed on the display device in lieu of the 3D representation of the scene from the reference virtual camera.

In some applications, the method may further include one or more of: generating a reference line in 3D space along the reference view direction from a reference virtual camera; continuously moving the auxiliary virtual camera between the reference view direction and a desired view direction; generating an icon at an intersection between the reference line and the portion; selectively and smoothly translating the icon along the reference line, e.g., dragging a digit against a surface of the touchscreen and along the reference line, to control an amount of pushing the portion away from and/or pulling the portion towards the reference virtual camera;

In a second aspect, some embodiments of the present invention relate to a computer-implemented method of manipulating some portion of a 3D representation of a scene resting on a virtual ground plane using a touch-sensitive display unit. In some implementations, the method includes generating and displaying on a display device of the touch-sensitive display unit the 3D representation of the scene from a point of view from a reference virtual camera; identifying, by the touch-sensitive display unit, the portion of the 3D representation of the scene to be manipulated; and manipulating the portion on a virtual carousel using the generated representation of the 3D scene. In some variations, manipulating the portion on a virtual carousel includes rotating the portion about an axis of rotation having a vertical central axis at a geometric center of the 3D representation of the scene. For example, manipulating the portion may include using a two-finger swiping motion against a surface of the touch-sensitive display device to rotate the portion about the axis of rotation.

Manipulating the portion may also include rotating the portion about the virtual carousel. For example, rotating the portion about the virtual carousel may include designating, against a surface of the touch-sensitive display unit, a first touch point and a second touch point; and rotating the virtual carousel about a vertical axis of rotation defined by a midpoint between the first and the second touch points.

In another application, manipulating the portion includes introducing pitch to the virtual carousel by manipulating an angle between the virtual ground plane and a forward view direction of the reference virtual camera. For example, manipulating the angle between the virtual ground plane and a forward view direction of the reference virtual camera may include using a two-finger swiping motion against a surface of the touch-sensitive display device to modify the angle and pitch.

In a third aspect, embodiments of the present invention relate to a system for manipulating a portion of a 3D representation of a scene. In some implementations the system includes a programmable processor; a touch-sensitive display unit having a display device; and memory for storing machine-readable instructions executable by the processor. In some variations, the instructions, when executed, cause the processor to identify, using the touch-sensitive display unit, the portion of the 3D representation of a scene to be manipulated and to translate and/or to rotate the portion using the touch-sensitive display unit.

BRIEF DESCRIPTION OF THE DRAWINGS

The foregoing features and advantages of embodiments of the invention will become more apparent from a reading of the following description in connection with the accompanying drawings, in which.

DETAILED DESCRIPTION OF THE INVENTION

Computer-implemented methods for translating and/or rotating an object(s) or some portion of a 3D representation of a scene in a 3D representation of a scene in 3D space using a touch-sensitive display unit (hereinafter a touchscreen) will now be described. Although the invention will be described assuming that the image data of the object or artwork are being translated or rotated, those of ordinary skill in the art can appreciate that the invention may also pertain to translating and rotating entire planar canvases on which the image data are locked, glued, embedded, stored, or the like.

Translation

In some applications, manipulating an object(s) in or some portion of a 3D representation of a scene may require translating, i.e., pulling or pushing, the object(s)—or a second frontal planar canvas—along the view direction of a reference virtual camera, which is to say in a direction that is orthogonal or normal to the reference frontal planar canvas. The practical effect of such translation is to move the object(s) or artwork closer to or farther from the reference virtual camera in a view direction that is normal or substantially normal to the reference frontal planar canvas. Due to the view direction of the reference virtual camera, however, the translation and effects of the translation may not be readily apparent to the user.

Figure 1A:
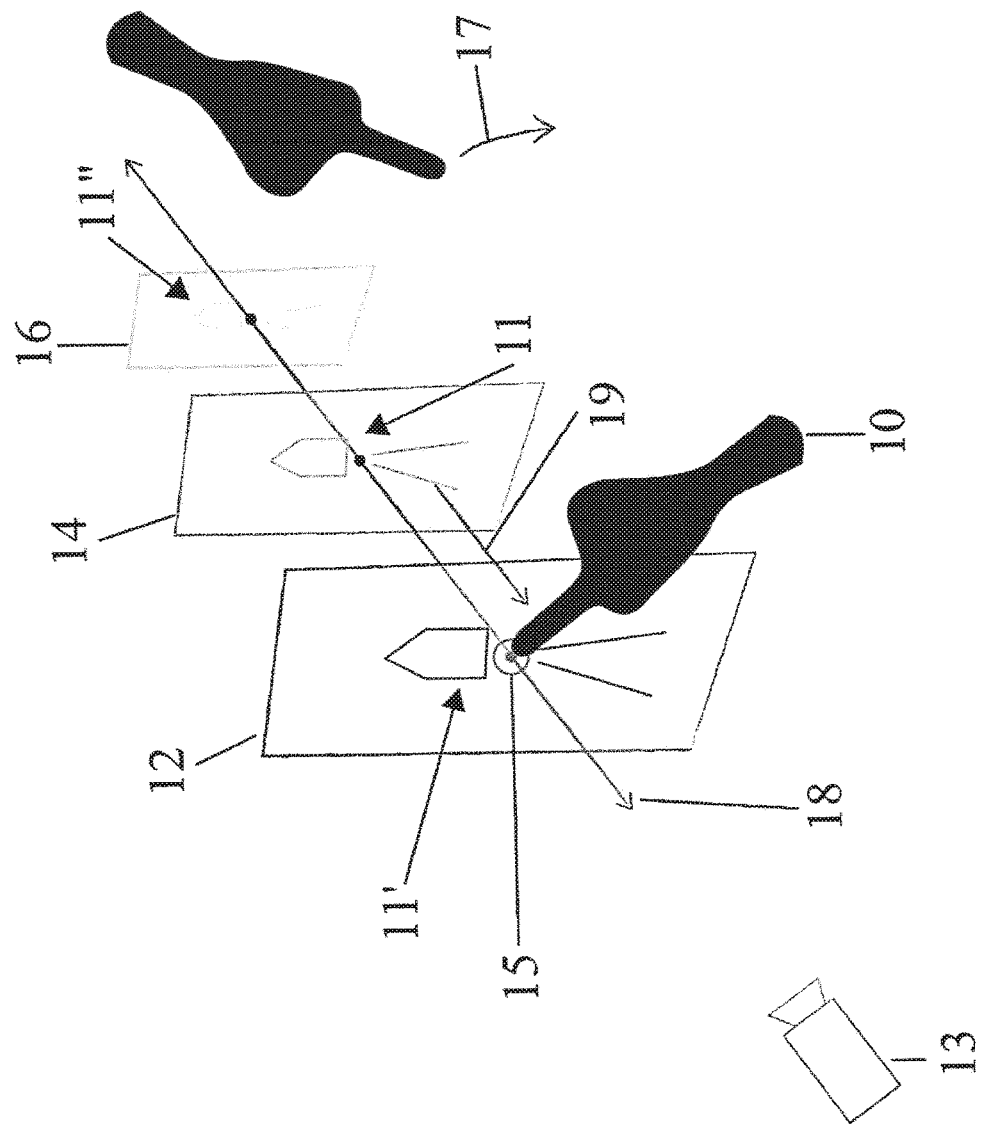
FIG. 1A illustrates an exemplary method of 3D object manipulation by translation that includes providing an auxiliary view of images of the artwork, in accordance with some embodiments of the present invention.
Figure 1B:
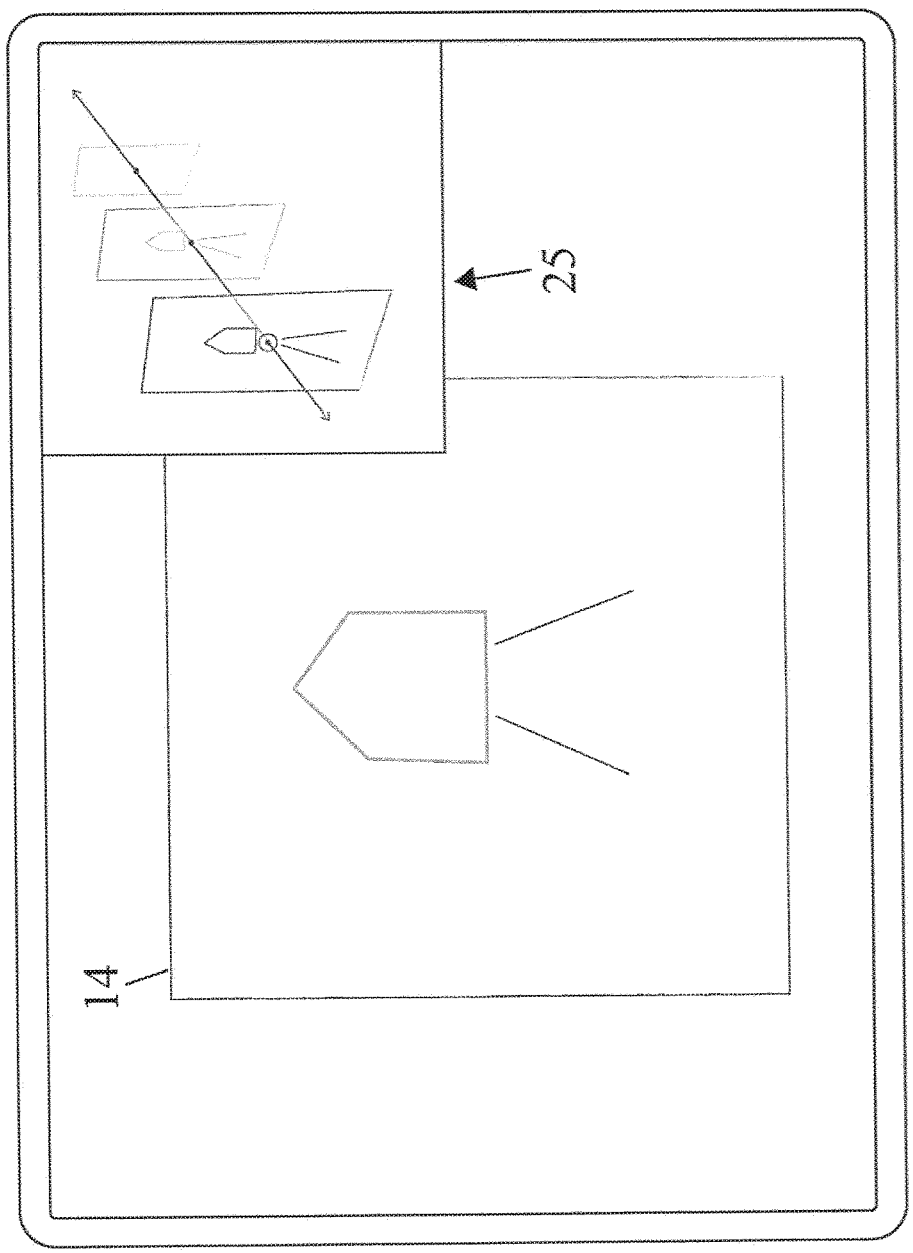
FIG. 1B illustrates another exemplary method of 3D object manipulation by translation that includes providing an auxiliary pop-up window, in accordance with some embodiments of the present invention.
Figure 2:
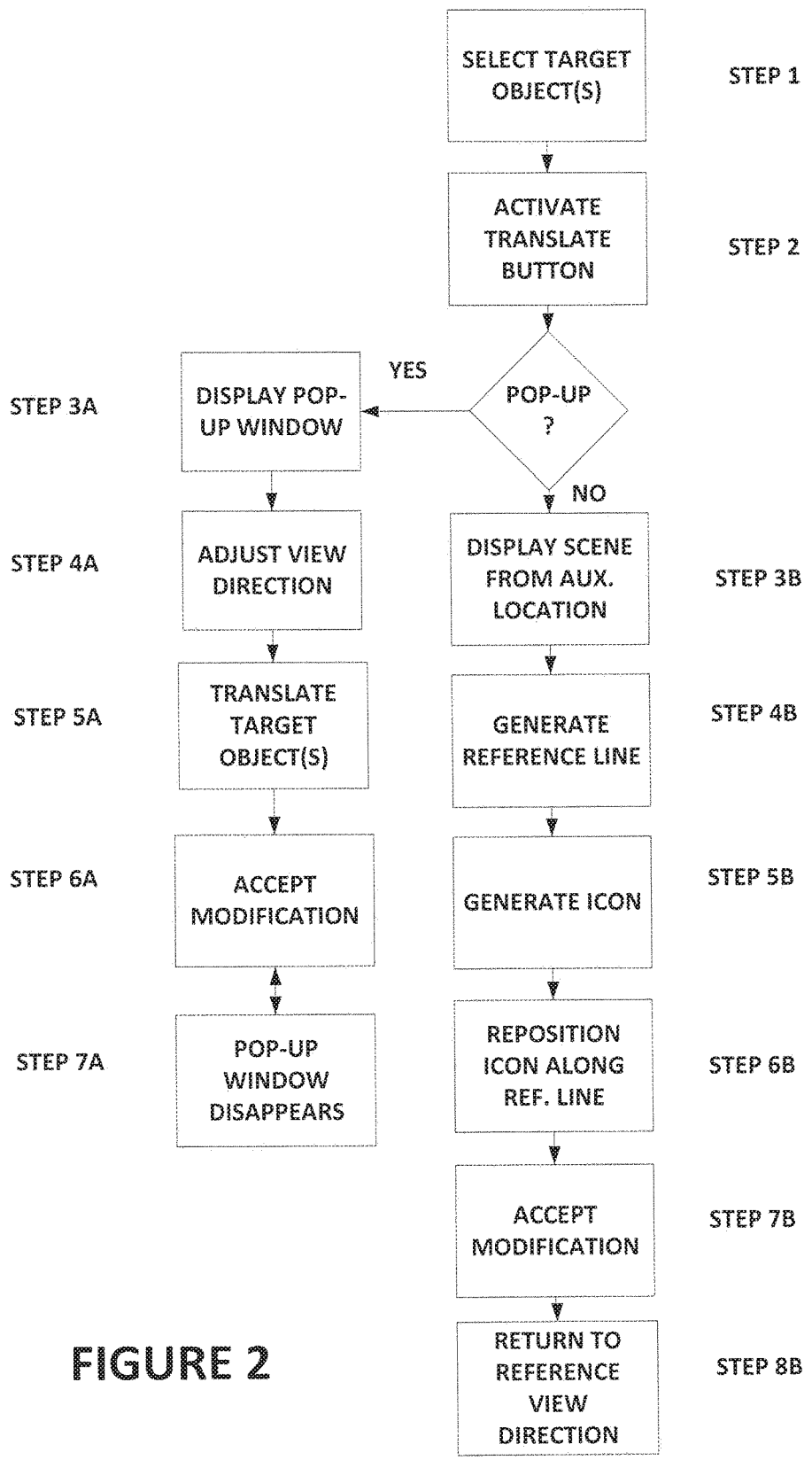
FIG. 2 is a flow chart of an illustrative method for translating an object in 3D space, in accordance with some embodiments of the present invention.

Referring to FIGS. 1A, 1B, and 2, a computer-implemented method for moving (i.e., translating) an object(s) 15 or some portion of the 3D representation of the scene, using, for example, a user interface of a touch-sensitive display unit (hereinafter a touchscreen) is shown. In a first step, the method may include selecting on a reference frontal planar canvas 14 the target object 11 or artwork to be moved (STEP 1). In some embodiments, the touchscreen may include software and a processor that, when the processor executes the software, provides or generates a menu bar or a drop down menu that includes a push/pull translation button expressly provided for translating an object(s) from the reference frontal planar canvas 14 to a second planar canvas 12 that is closer to the reference virtual camera 13 than the reference frontal planar canvas 14 or to a second planar canvas 16 that is farther from the reference virtual camera 13 than the reference frontal planar canvas 14. Once the push/pull button has been activated (STEP 2), either an auxiliary pop-up window 25 (FIG. 1B) or view, may appear—often in a smaller scale representation of the images already on the screen of the display device—in some portion of the display device (STEP 3A) or, in the alternate, the reference virtual camera 13 may be automatically positioned to a second or auxiliary location (STEP 3B) at a pre-determined and/or selectively adjustable angle measured from the view direction of the reference virtual camera 13 to provide a perspective view (FIG. 1A). Both the pop-up view (STEP 3A) and the virtual camera at an auxiliary location (STEP 3B) provide an auxiliary, e.g., perspective, view of images of the target object(s) 11 and other artwork and the selected reference frontal planar canvas 14, as well as images of the projected target object(s) 11', 11" as they appear on other planar canvasses 12, 16 as the target object(s) 11 is manipulated. The pop-up view 25 and view from an auxiliary location may include a perspective view taken from the side, the top, or the bottom of the reference frontal planar canvas 14. Advantageously, the pop-up view 25 and view from an auxiliary location may provide a better vantage point from which to view the manipulated geometry of the selected target object(s) 11. Indeed, providing a perspective view of the selected target object(s) 11 on the reference frontal planar canvas 14 and projected target object(s) 11', 11" on second frontal planar canvasses 12, 16 taken from the side, the top, or the bottom of the reference frontal planar canvas 14 enables the user 10 to view the projected image data on the various canvasses 12, 14, 16 as these image data are manipulated to translate the target object(s) 11. In some variations, the perspective view may include, for the purposes of illustration and not limitation, a ¾-top view, a ¾-side view, a ¾-bottom view, or the like.

The initial position in 3D space and orientation (i.e., the auxiliary view direction) of the auxiliary virtual camera may be pre-established or may be determined heuristically to provide a desired view direction of the manipulated target object(s) 11. Optionally, animation can be used, wherein the auxiliary virtual camera begins coincident with the reference virtual camera and is immediately and continuously moved until it reaches some desired view. Alternatively or optionally, the user 10 may be allowed to interactively adjust the position and orientation of the auxiliary virtual camera (STEP 4A) in 3D space within the pop-up view 25, e.g., using a standard virtual camera control interface. To assist the user 10 to better understand the relationship between the auxiliary view direction and the reference view direction, the position of the reference virtual camera 13 may be visualized in the pop-up window 25, e.g., using a small icon in 3D space. The geometry of the reference camera's frustum may also be visualized with a wireframe frustum shape embedded in 3D space.

Finally, using the pop-up view 25 as a reference, the user 10 may translate the target object(s) 11 to any frontal planar canvas (STEP 5A) located closer to or farther from the reference frontal planar canvas 14. Once satisfied with the magnitude of the translation, the user 10 may accept the changes (STEP 6A), which, in some applications, will cause the pop-up view 25 to disappear automatically from the display device (STEP 7A) and the data to be saved in memory.

In applications in which the view direction is taken from a second virtual camera at an auxiliary location (STEP 3B), in some variations, the processor may automatically create or generate a line 18 representative of the view direction of the reference virtual camera 13 (STEP 4B). In some applications, the reference line 18 extends from the center of the reference virtual camera 13 along the reference view direction, through countless frontal planar canvasses 12, 14, 16. In one variation of the embodiment, an icon 15, e.g., a circle icon or icon having another discernible geometric shape, having a touch sensitive portion may also be created or generated (STEP 5B) so as to appear on the screen of the display device of the touchscreen. Preferably, the icon 15 with the touch sensitive portion may be created or generated at an intersection between the reference line 18 and the selected target object 11 on the reference frontal planar canvas 14.

In a next step, the user 10 may move and re-position the icon 15, e.g., using a digit pressed against the surface of the touchscreen, a mouse pointer, a stylus, and so forth, anywhere along the reference line 18 (STEP 6B), in either direction, to pull or push the target object 11, respectively, closer to or farther away from the reference virtual camera 13. Those of ordinary skill in the art can appreciate that, in lieu of moving the object data of the target object(s) 11, in a variation, users 10 may move an entire frontal planar canvas on which the target object(s) 11 is locked, glued, embedded, stored, or the like. Moving the icon 15—or a second frontal planar canvas containing the target object(s) 11—along the reference line 18 translates the target object 11 along the reference virtual camera's view direction, which coincides with the reference line 18. For example, as shown in FIG. 1A, the user 10, e.g., using an index finger, may drag the icon 15 along the reference line 18 in the direction of the arrow 19, from the reference frontal planar canvas 14 to a second frontal planar canvas 12, causing the target object(s) 11 to be orthogonally projected in 3D space to a location consistent with the location of the icon 15 with respect to the reference line 18. Once satisfied with the magnitude of the translation, the user 10 may accept the change (STEP 7B), e.g., by removing the user's digit from the surface of the touchscreen, by clicking on or otherwise interacting with an "accept" and/or a "done" button displayed on the screen of the display device, or the like, which, in some applications, will cause the displayed auxiliary virtual camera view direction of the 3D representation of the scene to smoothly transition back to the view direction of the reference virtual camera 13 (STEP 8B) and the data to be saved in memory.

Optionally, in some implementations, movements 17 of the icon-moving device, e.g., the user's digit, a mouse, and so forth, against the surface of the touchscreen, that are not along the reference line 18 and/or that are not proximate the icon 15, may also be used for other control elements of the interface. For example, once the reference virtual camera 13 in the view direction of the reference frontal planar canvas 14 was been replaced by an auxiliary view direction, a movement 17 of the user's digit against the surface of the touchscreen may be used to modify the position, i.e., the angle, of the auxiliary camera with respect to the reference line 18 and, hence, the view direction of the auxiliary virtual camera.

The new frontal planar canvas 12 is further manipulatable, as are the position and/or orientation of the target object 11. The reference virtual camera geometry may be visualized, e.g., using or displaying an icon in 3D space and a wireframe frustum shape that may be embedded at some location in 3D space. Advantageously, the user 10 may manipulate, e.g., change the amount of translation of, the target object 11, until the user 10 is satisfied with the placement of the target object 11 in 3D space.

Rotation

Figure 3:
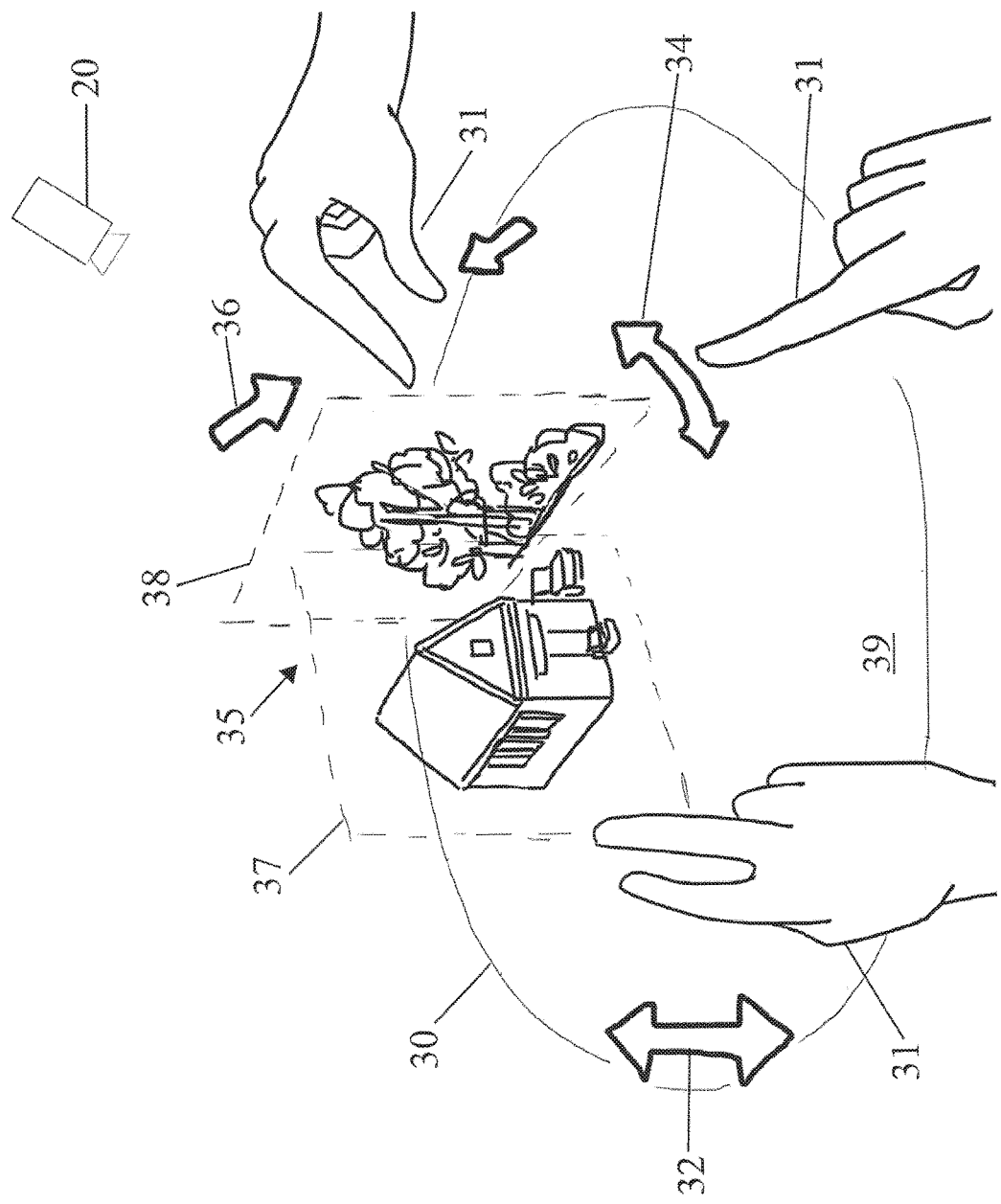
FIG. 3 illustrates exemplary methods of manipulation or a 3D representation of a scene resting on a virtual ground plane (e.g., a virtual carousel) by rotation, in accordance with some embodiments of the present invention.

In other applications for manipulating an object(s) in or portions of a 3D representation of a scene, there exists a need for rotating a target object or collection of objects, e.g., a scene, about an axis of rotation with respect to a reference virtual camera having a reference view direction. FIG. 3 depicts a collection of 3D objects (e.g., a house in a first 2D plane 37 and vegetation in a second 2D plane 38) or scene 35 resting on a virtual, planar carousel 30, e.g., an infinitely large rotatable planar disc. The virtual carousel, or disc, 30 represents a virtual ground plane 39, which may be chosen automatically based on the orientations and positions of the objects, individually or collectively, in the 3D scene 35. The virtual carousel 30 may be visualized by drawing the virtual ground plane 39 to include a radial pattern of lines around a vertical central axis of the virtual carousel 30. In some variations, the central axis of the virtual carousel 30 may be chosen to be the geometric center of an object or objects in the 3D scene 35. When the software and processor of the touchscreen operate the touchscreen in a carousel mode to allow for, inter alia, rotation of the object(s) in the 3D representation of the scene, the reference virtual camera or viewer 20 may be moved to a position above the 3D scene 35 looking down, for example, from a bird's-eye perspective.

Advantageously, the virtual carousel 30 has a defined or implied virtual ground plane 39. Navigation around the 3D scene 35 may be such that it does not introduce undesired roll, viz., pivoting of the view in the virtual ground plane 39 from side to side. Indeed, by fixing the roll angle of the 3D scene 35, one degree of navigational freedom, i.e., roll, may be eliminated, making it easier to manipulate the 3D scene 35 with the same amount of user input.

With the 3D scene susceptible to pitch and yaw only, the user may interact with objects in the 3D scene 35, individually or collectively. Advantageously, interaction may require no more than application of a touch gesture against the surface of the touchscreen. For example, the software and the processor executing the software instructions associated with the touchscreen may use a first touch gesture 32, which may include touching the surface of the touchscreen proximate the virtual carousel 30 with a plurality of digits 31, e.g., two fingers, and concurrently dragging both digits 31 vertically across the surface of the touchscreen, to adjust or modify the angle between the viewer's 20 forward view direction and the virtual ground plane 39 of the carousel 30, enabling the user to selectively view the scene 35 from a variety of pitches. For example, dragging both digits 31 vertically upward across the surface of the touchscreen may move the pitch in a nose down orientation, while dragging both digits 31 across the surface of the touchscreen in the opposite direction, e.g., vertically downward, may adjust the pitch to a nose up orientation.

The software and processor executing the software instructions may also use a second touch gesture 34 to rotate the viewer 20 about the vertical central axis of the virtual carousel 30. For example, the second touch gesture 34 may include swiping, e.g., circumferentially, the surface of the touchscreen proximate the virtual carousel 30 and about the vertical central axis with at least one digit 31. In some variations, the initial angular speed of rotation may be set proportional to the speed of the finger swipe, decreasing, thereafter, at a fixed or linear rate until the angular velocity reaches zero. Although the gesture 34 may cause the view direction of the viewer 20 to orbit about the vertical central axis and the 3D scene 35, the action also creates the illusion of the scene 35 spinning on the virtual carousel 30 with an angular momentum of inertia plus a fixed torque.

The software and processor executing the software instructions may also use a third touch gesture 36 that may include touching the surface of the touchscreen anywhere on the image of the virtual carousel 30 with a pair of digits 31, e.g., two fingers, and moving those digits 31 in various ways with respect each other. In a first implementation, after touching the surface of the touchscreen in two locations, by changing a distance between the two initial touch points, e.g., by moving the digits away from each other while sliding them against the surface of the touchscreen, the processor may cause the viewer 20 to move closer to the 3D scene 35 ("pinching"), e.g., by moving a frontal planar canvas closer to the viewer 20 than the reference frontal planar canvas, or may move the 3D scene 35 farther from the viewer 20 ("pinching away"), e.g., by moving a frontal planar canvas farther from the viewer 20 than the reference frontal planar canvas. "Pinching away" produces the illusion of enlarging the 3D scene 35 while "pinching" produces the illusion of shrinking the 3D scene 35.

In another implementation, after the pair of digits 31 has contacted the surface of the touchscreen at two locations (i.e., touch points), the user may twist her digits 31 with respect to each other. This twist gesture effectively rotates the viewer 20 and the virtual camera view direction about an imaginary axis created at a mid-point between the two touch points and perpendicular to the virtual ground plane 39. After the pair of digits 31 has contacted the surface of the touchscreen at two locations, the user may also drag the pair of digits 31 freely against the touchscreen to translate the viewpoint in the 3D scene 35. Finally, after the pair of digits 31 has contacted the surface of the touchscreen, rotation and/or translation of the 3D scene 35 may result. These gestures include "finger-sticking," such that projected points on the virtual carousel 30 beneath the touch points remain under the user's fingers throughout the duration of the gesture, i.e., the fingers are stuck to the ground plane 39.

Figure 4:
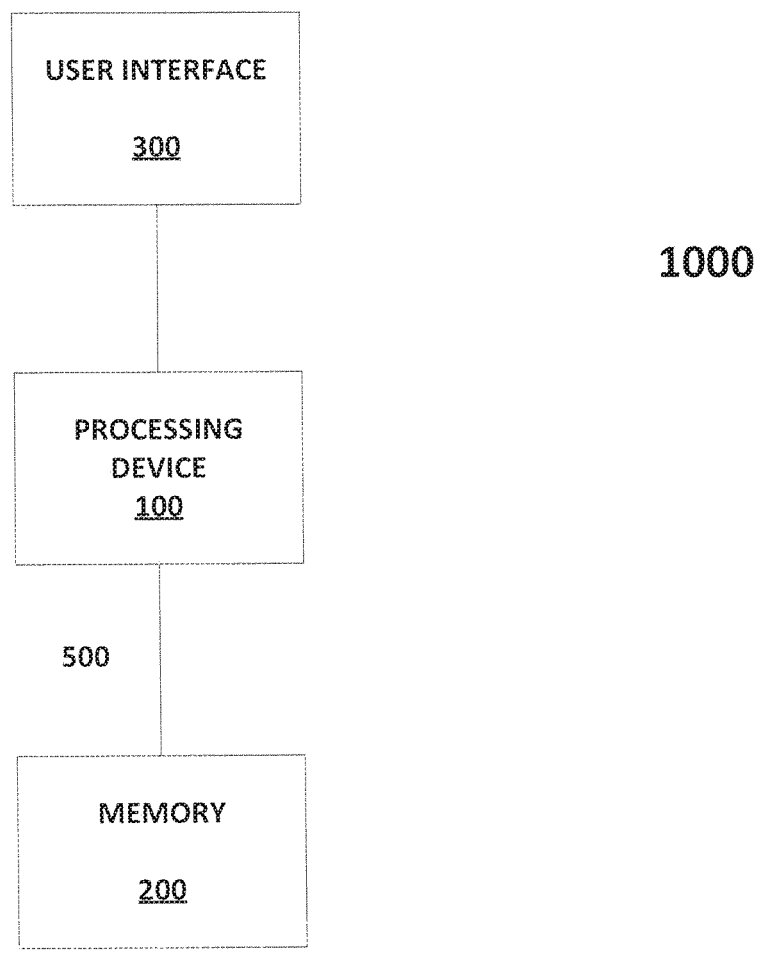
FIG. 4 provides an illustrative system for 3D object manipulation on a touch screen, in accordance with some embodiments of the present invention.

Having described a method, a computer graphics system 1000 for converting 2D drawings or images into a 3D graphical representation of a scene will be described. Referring to FIG. 4, in some embodiments, the system 1000 includes a processing device 100, memory 200, and a user interface 300, e.g., a touchscreen, that are in electronic communication with each other via wireless or hard-wired communication. Components of the system 1000 may be coupled by an interconnection element such as a bus 500. The bus 500 enables communications, e.g., the transfer of data and instructions, to be exchanged, e.g., wirelessly or by hardwire, internally between components and externally between system components. Thus, the bus 500 may include one or more physical busses, e.g., between components that are integrated within the system 1000, as well as a communication coupling between system elements, e.g., specialized or standard computing bus technologies such as IDE, SCSI, PCI, and InfiniBand. In some variations, components of the system 1000 may be disposed in the same physical server and, thus, physical connectivity between the components may not be required.

The processing device 100 may include an operating system that manages at least a portion of the hardware elements included therein. Usually, a processing device 100 or controller executes an operating system which may be, for example, a Windows-based operating system (e.g., Windows 7, Windows 2000 (Windows ME), Windows XP operating systems, and the like, available from the Microsoft Corporation), a MAC OS System X operating system available from Apple Computer, a Linux-based operating system distributions (e.g., the Enterprise Linux operating system, available from Red Hat Inc.) or a UNIX operating system available from various sources. Many other operating systems may be used, and embodiments are not limited to any particular implementation. Operating systems conventionally may be stored in memory 200.

The processing device 100 and the operating system together define a processing platform for which application programs in high-level programming languages may be written. These component applications may be executable, intermediate (for example, C-) or interpreted code which communicate over a communication network (for example, the Internet) using a communication protocol (for example, TCP/IP). Similarly, aspects in accordance with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft of Seattle, Wash., and Oracle Database from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention. In one or more of the embodiments of the present invention, the processing device 100 may be adapted to execute at least one application, algorithm, driver program, and the like. The applications, algorithms, driver programs, and the like that the processing device 100 may process and may execute can be stored in memory 200.

The processing device 100 may also perform functions outside the scope of the invention. In such instances, aspects of the system 1000 may be implemented using an existing commercial product, such as, for example, Database Management Systems such as SQL Server available from Microsoft of Seattle, Wash., and Oracle Database (Spatial) from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention.

"Memory" 200 may be used for storing programs and data during operation of the system 1000. Memory 200 can be multiple components or elements of a data storage device(s) or, in the alternate, can be stand-alone devices. More particularly, memory 200 can include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present invention may organize memory 200 into particularized and, in some cases, unique structures to perform the aspects and functions disclosed herein.

User interfaces 300, e.g., graphical user interfaces (GUI), touch-sensitive screens, and the like, provide a vehicle for human interaction, with a machine, e.g., the processing device 100, in which the human user provides input to direct the machine's actions while the machine provides output and other feedback to the user for use in future input. User interfaces 300 are well known to the art and will not be described in detail except in connection with the computer graphics system of the present invention. In the current context, in some embodiments, the user interface enables users to manipulate the location and orientation of objects in a 3D scene in 3D space. Although the system 1000 will be described in terms of a single stroke or multiple strokes as objects, those skilled in the art can appreciate that the object could be any form of an image, texture, and so forth.

Those of ordinary skill in the art may realize that the invention may be embodied in other specific forms without departing from the spirit or essential characteristics thereof. The foregoing embodiments, together with the attached drawings, are, therefore, to be considered in all respects illustrative rather than limiting of the invention described herein.

What we claim is:

1. A computer-implemented method, using a touch-sensitive display unit having a display device, of manipulating a portion of a three-dimensional (3D) representation of a scene being displayed on the display device from a reference view direction, the method comprising:
    identifying, by the touch-sensitive display unit, the portion of the 3D representation of the scene to be translated;
    generating and displaying, concurrently while displaying the 3D representation of the scene from the reference view direction, in a pop-up window on some portion of the display device, a second 3D representation of the scene from an auxiliary view direction that differs from the reference view direction; and
    using the second 3D representation of the scene to translate the portion of the 3D representation of the scene.

2. The method of claim 1, wherein translating the portion of the 3D representation of the scene comprises moving the portion at least one of closer to or farther from a reference virtual camera.

3. The method of claim 1, wherein generating and displaying the second 3D representation of the scene comprises positioning an auxiliary virtual camera having a location in 3D space remote from that of a reference virtual camera.

4. The method of claim 3, wherein the location in 3D space comprises at least one of from a side of, above, or below the reference view direction.

5. The method of claim 3, wherein the auxiliary virtual camera is continuously moved from the reference view direction to a desired view direction.

6. The method of claim 1, wherein the auxiliary view direction is selectively adjustable.

7. A computer-implemented method, using a touch-sensitive display unit, of manipulating some portion of a three-dimensional (3D) representation of a scene from a reference view direction, the method comprising:
    identifying, by the touch-sensitive display unit, the portion of the 3D representation of the scene to be translated;
    generating and displaying on some portion of a display device of the touch-sensitive display unit a second 3D representation of the scene from an auxiliary view direction;
    generating and displaying on the display device a reference line in 3D space along the reference view direction from a reference virtual camera; and
    using the reference line and the second 3D representation of the scene to translate the portion of the 3D representation of the scene along the reference line displayed on the display device.

8. The method of claim 7 further comprising generating an icon at an intersection between the reference line and the portion.

9. The method of claim 8 further comprising translating the icon along the reference line to control an amount of at least one of pushing the portion away from or pulling the portion towards the reference virtual camera.

10. The method of claim 9, wherein translating the icon comprises dragging a digit against a surface of the touchscreen and along the reference line.

11. A system for manipulating a portion of a three-dimensional (3D) representation of a scene from a reference view direction, the system comprising:
    a programmable processor;
    touch-sensitive display unit having a display device; and
    memory for storing machine-readable instructions executable by the processor, wherein, when executed, the instructions cause the processor to:
        display, using the display device, the 3D representation of the scene;
        identify, using the touch-sensitive display unit, the portion of the 3D representation of a scene to be manipulated;
        generating and displaying, concurrently while displaying the 3D representation of the scene from the reference view direction, in a pop-up window on some portion of the display device a second 3D representation of the scene from an auxiliary view direction that differs from the reference view direction; and
        at least one of translate or rotate the portion using the touch-sensitive display unit.

12. A system for manipulating a portion of a three-dimensional (3D) representation of a scene from a reference view direction, the system comprising:
    a programmable processor;
    touch-sensitive display unit having a display device; and
    memory for storing machine-readable instructions executable by the processor, wherein, when executed, the instructions cause the processor to:
        display, using the display device, the 3D representation of the scene;

identify, using the touch-sensitive display unit, the portion of the 3D representation of a scene to be manipulated;

generate and display on the display device a second 3D representation of the scene from an auxiliary view direction that differs from the reference view direction;

generate and display on the display device a reference line in 3D space along the reference view direction from a reference virtual camera; and translate, using the reference line and the second 3D representation of the scene, the portion along the reference line displayed on the display device.

13. The system of claim 12, wherein the machine-readable instructions, when executed, further cause the processor to generate an icon at an intersection between the reference line and the portion.

14. The system of claim 13, wherein the machine-readable instructions, when executed, further cause the processor to translate the icon along the reference line to control an amount of at least one of pushing the portion away from or pulling the portion towards the reference virtual camera.

\* \* \* \* \*